C. A. KING.
MANUFACTURE OF GUN BARRELS.
No. 175,862.  Patented April 11, 1876.
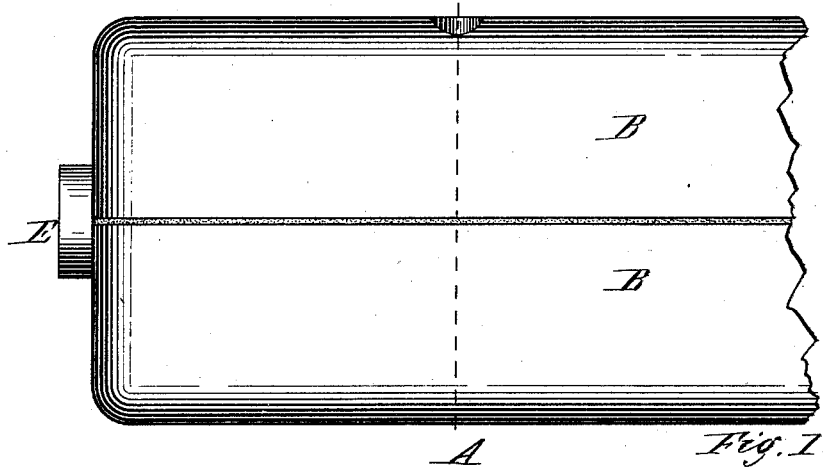
Fig. I.
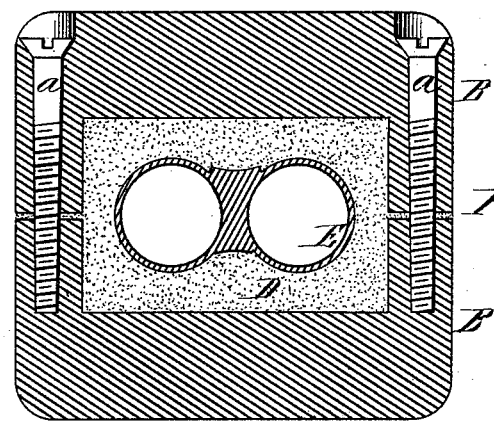
Fig. II.
Witnesses.
W. H. Bradway
C. E. Buckland
Inventor,
Charles A. King
By T. A. Curtis,
his atty.

UNITED STATES PATENT OFFICE.

CHARLES A. KING, OF MERIDEN, CONNECTICUT.

IMPROVEMENT IN THE MANUFACTURE OF GUN-BARRELS.

Specification forming part of Letters Patent No. 175,862, dated April 11, 1876; application filed September 9, 1875.

*To all whom it may concern:*

Be it known that I, CHARLES A. KING, of Meriden, State of Connecticut, have invented a new and useful Method of Securing Gun-Barrels while Boring and Finishing them; and that the following is a full, clear, and exact description thereof, reference being had to the accompanying drawings, making a part of this specification and description.

The object of this invention is to cause all portions of a gun-barrel along its length to retain a constant fixed position and remain perfectly firm and solid while being bored or reamed out, so that, when finished, the barrel will have a perfectly true and uniform bore throughout.

To this end my invention consists in embedding the gun-barrel, whether single or double, in a suitable plastic material, which will afterward become solid and hard—as, for example, plaster-of-paris—and, when the said material has sufficiently hardened or "set," of boring out the barrel and giving it its inside finish.

Figure I represents a portion of the length of a case inclosing the plastic material within which the gun-barrels are embedded ready for boring, and Fig. II represents a section of the same at line A.

It is well known that in boring and finishish light and thin shot-gun barrels great difficulty often occurs in making the bore perfectly true inside, owing to the tendency of the metal to give way or yield wherever the boring-tool comes into firm contact with the metal, more especially if the work is at all hurried, sometimes the barrels even becoming twisted, after which they are entirely worthless, and this often occurs, even with the best methods now practiced of holding the barrel as firmly as possible.

To overcome this difficulty I embed the barrel to be bored in some plastic material which will afterward set hard; and, for greater convenience in handling the barrel during the operation of boring, and to hold it more firmly, I use two pieces, B, of suitable material, each having a channel or groove made lengthwise therein, and secure them together with screws a, or in any other suitable manner, with the grooves toward each other. Then setting this case on end, I set the barrel to be bored on end in the center of the inclosed space, and mix up with water a sufficient quantity of plastic material (preferably plaster-of-paris, as that sets quickly and becomes quite hard) to the proper consistency, and pour or place it in the inclosed space and around the gun-barrel, packing it in quite firmly, as shown at D in Fig. II. After the plaster sets or becomes quite hard, which occurs in a few minutes, the barrel so prepared is ready to be bored out and receive its inside finish.

Instead of filling the grooved pieces B after they are secured together, each groove may be filled with the plaster, the barrel E placed therein, and the two pieces B be then secured together, and the plaster be allowed to harden. In either case the result is the same, and the pieces B, being easily handled and held when so secured together, the barrel may be secured perfectly firm and rigid, and held while being bored much more conveniently and readily than the barrel could be held without being so incased, while all liability of injuring the barrel when made light and thin by contact with hard substances in holding it is entirely avoided.

Having thus described my invention, what I claim as new is—

The method of securing gun-barrels during the operations of boring and finishing them, hereinbefore described—that is to say, by embedding the barrel in a plastic material, so that when said material shall have set or hardened the barrel will be secured firmly in its position and protected from abrasion and injury, substantially as described.

CHARLES A. KING.

Witnesses:
JOSEPH H. BECKETT,
RALPH A. PALMER.